July 15, 1947.　　　I. AUERBACH　　　2,423,822
CALCULATOR
Filed Oct. 27, 1944　　　2 Sheets-Sheet 1

INVENTOR
ISIDOR AUERBACH
BY William D. Hall
ATTORNEY

July 15, 1947.   I. AUERBACH   2,423,822
CALCULATOR
Filed Oct. 27, 1944   2 Sheets-Sheet 2

LOBE PATTERN OF RADAR $M_1$ = ANGLE OF FIRST MAXIMUM
$N_1$ =   "       "     "    MINIMUM
$M_2$ =   "       "   SECOND MAXIMUM

LOBE PLOTTING

ELLIPTICAL AREA REFLECTION

INVENTOR
ISIDOR AUERBACH
BY William D. Hall.
ATTORNEY

Patented July 15, 1947

2,423,822

UNITED STATES PATENT OFFICE 2,423,822

CALCULATOR

Isidor Auerbach, Drew Field, Fla.

Application October 27, 1944, Serial No. 560,581

2 Claims. (Cl. 235—78)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in mechanical calculating devices.

Heretofore, the vertical polar diagram of a radar system at a particular site could only be obtained by computation from data procured by actual calibration flights, there being no calculating device available for such a purpose. It is therefore an object of this invention to provide a mechanical device which may be used to compute the vertical polar diagram to be used as a first approximation for an ideal radar system site until actual calibration flights can be made.

It is a further object of this invention to provide a device which will enable the vertical polar diagram of a radar station to be simply and easily calculated.

It is a further object of this invention to provide a device that will enable the angle of elevation for all maxima and minima of the lobe patterns of the vertical polar diagram up to and including the five lobes of the radar stations antenna system to be quickly and easily determined.

A further object of this invention is to provide a device which will quickly and easily enable the calculation of the spatial configuration in a vertical plane for a given signal to noise ratio of the range of a given radar system.

It is still another object of this invention to provide a calculating device that will permit determination of limits of the elliptical area in which ground reflection actually takes place in the operation of a radar system.

These and other objects are attained by the novel arrangement and construction of parts hereinafter described and illustrated in the accompanying drawing, forming a part hereof, and in which.

In general, the calculator is made up of three concentric discs 1, 2, 3 mounted upon a common pivot 4 together with a transparent rotating arm 5. The three discs are of different sizes so that the largest disc has two scales exposed, the middle disc has two scales exposed, and the topmost disc has its entire surface exposed. All three discs, as well as the transparent rotating arm, are so mounted as to permit motion independently of each other.

In all radar systems using ground reflections to increase the signal field strength, path phase differences between the direct ray and the reflected ray will cause the vertical polar diagram to show the characteristic pattern of lobes and minima. The equation for the angles at which maxima and minima occur is:

$$\sin \alpha = \frac{n\lambda}{4h}$$

where $\alpha$=angle of elevation.
$n$=integer.
$\lambda$=wavelength.
$h$=effective height of antenna.

For low angle coverage where the sin of an angle is approximately equal to the angle the equation is modified to:

$$\alpha = \frac{14,100n}{fh}$$

where $\alpha$=angle of elevation.
$n$=integer.
$f$=frequency in megacycles/sec.
$h$=effective height of antenna.

The factors affecting lobe angles and lobe patterns are the surface from which the reflection takes place, and the mean antenna height above the surface. The energy reflected from the ground is not reflected from a point on the ground, but from an elliptical area on the ground. The limits of this area are given as $P_n$ and $P_f$ in the following discussion on various types of sites; $P_n$ always being the distance from the antenna to the near part of the reflecting area, and $P_f$ always being the distance to the far part of the reflecting surface. $P_r$ is the assumed reflection point of the energy. Energy from the radar has two paths to reach the plane, one by the direct air path, the other, reflected from the ground. This reflected energy may add or subtract from the energy traveling directly to the plane, thus producing lobes and nulls.

a. The equations previously given assume that reflection occurs at a single point. Actually the reflection area is an ellipse with its major axis in the direction of propagation.

When:

$P_n$=distance from radar antenna to near edge of area.
$P_f$=distance from radar antenna to far edge.
$P_r$=distance from radar antenna to assumed reflection point.

Then:

$$P_n = 0.7 \frac{h^2}{\lambda}$$

$$P_f = 23.3 \frac{h^2}{\lambda}$$

$$P_r = 4 \frac{r^2}{\lambda}$$

Figure 1:
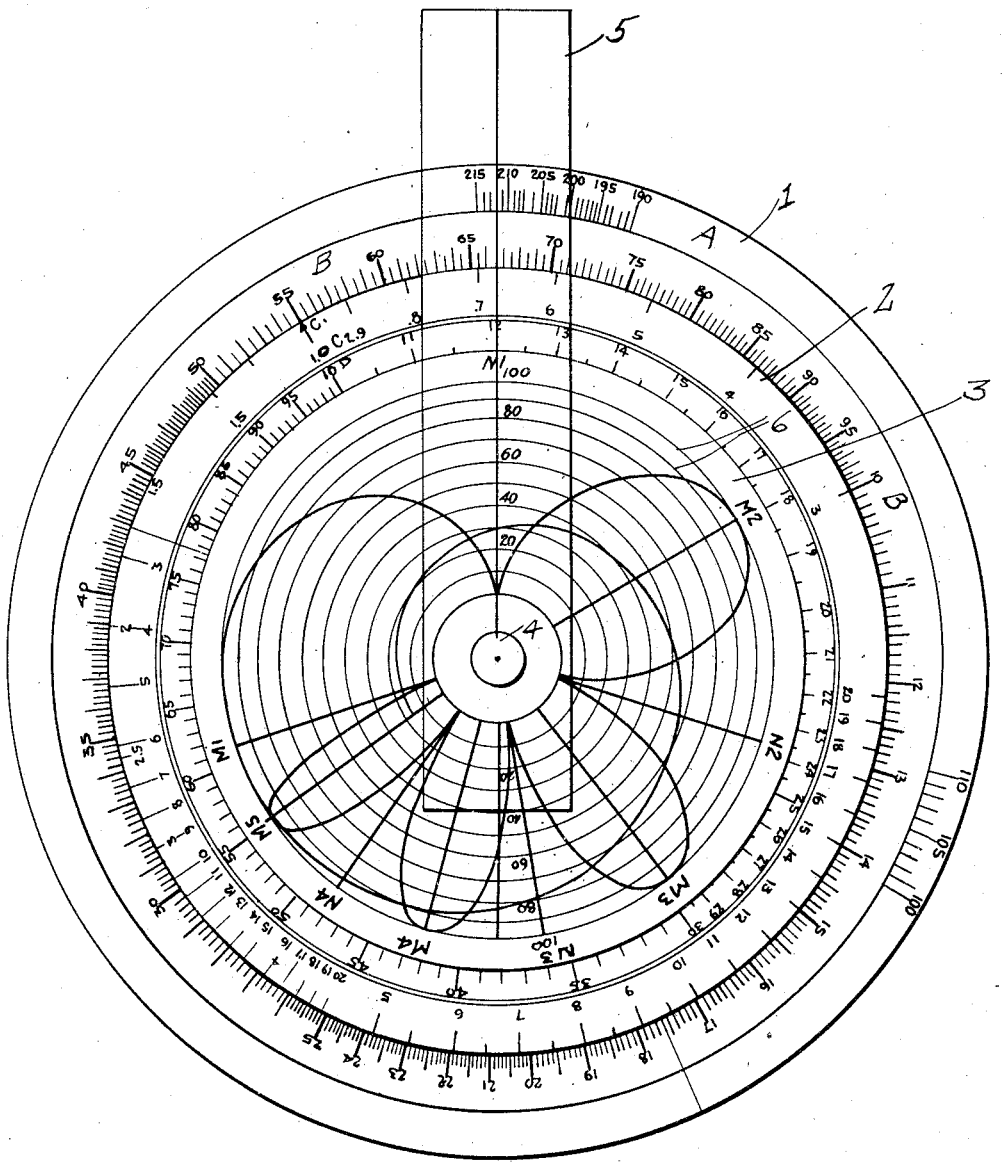
Figure 1 is a plan view of the computing device.
Figure 2:
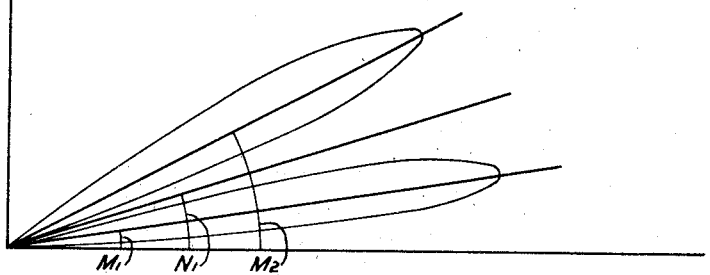
Fig. 2 is a lobe pattern of a radar station.

The largest disc has two scales A and B marked thereon. Scale A consists of two direct reading frequency sections; one from 100 to 110 megacycles per second and another from 190 to 215 megacycles per second. The B scale is drawn completely around the periphery of the disc 1 and is a logarithmic scale. The second disc 2 is smaller and has drawn thereon three scales $C_1$, $C_2$ and D. $C_1$ is drawn to represent logarithms of squares and scale $C_2$, directly below $C_1$, is drawn to the squares of the figures on $C_1$. Scale D is a duplicate of scale B above described. The smallest disc 3 has ten equidistant concentric circles 6 inscribed thereon, and plotted on these circles are the first five lobes of a polar lobe diagram using the equation: Range equals range (max) $\times \sin (90N)°$. The maximum points are designated $M_1$, $M_2$, $M_3$, $M_4$, and $M_5$. The null points are designated $N_1$, $N_2$, $N_3$, $N_4$, and $N_5$. All of the discs may be rotated independently of each other (see Fig. 1).

The operation of the calculator in the several cases is as follows:

*a. Angle of elevation of maxima and minima*

1. For radar units operating in the frequency range 190–215 megacycles per second, and from 100–110 megacycles per second, the calculator is used by setting the arm so that the hair line on the rotating arm is directly over the known frequency on scale A, and then rotating the intermediate disk until the effective height of the antenna on scale D is also under the hair line. The angle of elevation of the first lobe is then indicated on scale B by the pointer drawn at position 1.0 on scale $C_1$.

*Example.*—A radar unit on level ground operating at 212 megacycles per second with an effective height of 12 feet. Set the hair line on the rotating arm to 121 (scale A). Rotate the intermediate disc until 12 (scale D) falls under the hair line. The arrow at 1.0 on scale $C_1$ indicates an angle of 5.55 degrees for the first lobe. The scale showing the radio frequencies is calibrated by hand on the chart. The position of the scale is determined by direct observations at the various frequencies and is not a logarithmic scale.

2. For radar sets operating on frequencies not in the ranges listed above use must be made of the formula:

$$\alpha = \frac{14,000n}{fh}$$

Let $n=1$ and use the scales B and D as regular slide rule scales to solve the equation. Greater accuracy will be obtained by first multiplying frequency and height, then dividing by 14,100 and then getting the reciprocal.

3. After obtaining the angle of elevation of the first lobe, without changing the other discs, rotate the smallest disc until the point $M_1$ is directly under the hair line. Rotating the arm to positions $N_1$, $N_2$, $N_3$, and $N_4$, will enable the angle of minima to be read on scale B. Rotating the arm to positions $M_1$, $M_2$, $M_3$, $M_4$, and $M_5$ will enable the angles of elevation of the first, second, etc., lobe to be read on scale B.

*b. Spatial configuration in a vertical plane of the range of the set for a given signal to noise ratio*

Figure 3:
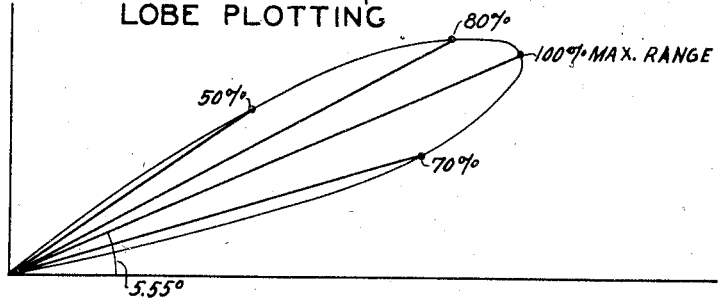
Fig. 3 is a diagram of lobe plotting.
Figure 4:
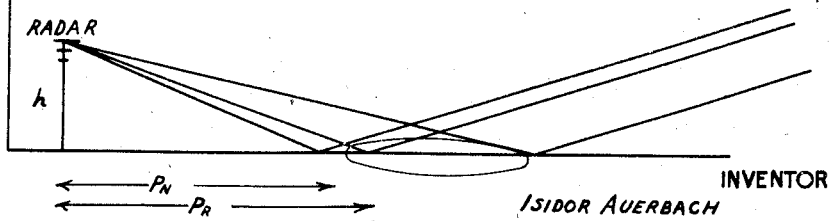
Fig. 4 is a dagram showing elliptical area reflection.

After determining the angle of elevation, a vertical polar diagram can be drawn when the maximum range is known (see Fig. 3). With the calculated angle of elevation for the first lobe (scale B), and the position $M_1$ under the hair line, the percentage of the maximum range for the set at other angles may be determined by rotating the arm to the desired angle and reading the percentage directly from the intersection of the hair line and the graph on the inner disc. The concentric circles on the inner disc are graduated in percentage. The first five lobes can be plotted directly by this method.

*Example.*—Using 5.55° as the angle of maximum radiation for the first lobe, the following results can be read:

| | | Per cent |
|---|---|---|
| 3.6° | 6.6° | 90 |
| 3.04° | 7.2° | 80 |
| 2.57° | 7.65° | 70 |
| 2.17° | 8.16° | 60 |
| 1.72° | 8.4° | 50 |
| 1.40° | 8.75° | 40 |
| 1.006° | 9.08° | 30 |
| .676° | 9.4° | 20 |
| | 9.76° | 10 |

The second lobe gives:

| | | Per cent |
|---|---|---|
| 13.8 | 16.38 | 90 |
| 13.2 | 17.0 | 80 |
| 12.7 | 17.5 | 70 |
| 12.25 | 18.0 | 60 |
| 11.93 | 18.4 | 50 |
| 11.55 | 18.8 | 40 |
| 11.2 | 19.1 | 30 |
| 10.86 | 19.42 | 20 |
| 10.43 | 19.7 | 10 |

*c. Conversion of given signal to noise ratios observed at definite ranges to other signals to noise ratios at corresponding ranges*

A calibrating plane flown to determine the actual vertical polar diagram for a radar unit will give varying signal to noise ratios depending on its position in the lobes. Each vertical polar diagram is drawn for a definite ratio. A plane flying at a constant height through the lobe will twice show the desired signal to noise ratio. As it flies through the lobe the ratio will increase to a maximum and then decreases. The ratios may be used to extrapolate to give additional points for the vertical polar diagram by using scales B and C. Use scale B as a range scale in miles, and the appropriate C scale as a signal to noise ratio scale. Scale $C_1$ will be used for linear detector receivers and $C_2$ for square law detector receivers. Rotate the arm so that the observed range on the B scale is directly under the hair line, rotate the intermediate disc until the proper observed ratio is also under the hair line. Rotate the arm to the desired signal to noise ratio and read off the range at which it should be observed on scale B.

*Example.*—A station received a target at 35 miles with a signal to noise ratio of 5:1. Put 35 on the B scale and 5 on the $C_1$ scale in line. Then the following ranges and signal to noise ratios should be expected:

| Ratio | Range |
|---|---|
| | *Miles* |
| 8 | 27.8 |
| 4 | 39.2 |
| 3 | 45.6 |
| 2 | 55.6 |
| 1 | 78.8 |

*d. Limits of reflecting area*

Using the equations in paragraph 3b, and the scales B and D as in linear slide rules, the reflection points may be calculated.

*Example.*—Using the frequency 212 megacycles/sec. and height 12 feet:

$$P_n = 21.7 \text{ feet}$$
$$P_f = 730 \text{ feet}$$
$$P_r = 125 \text{ feet}$$

e. Handy circular slide rule

Scales B and D are equivalent to similar scales in a slide rule. Multiplication and division of square roots can be done by using scale $C_1$ and fourth roots by using scale $C_2$.

I claim:

1. A device for calculating the vertical polar diagram of a radar station, comprising a first disc having a first direct frequency scale section of a predetermined range of frequencies and a second direct frequency scale section of a different range of frequencies, and a logarithmic scale drawn completely around the periphery of the first disc, a second disc, of less diameter than the first disc, said second disc having a first scale drawn about its periphery to represent logarithms of squares and a second scale drawn to the squares of the first scale and a third scale similar to the logarithmic scale on the first disc, a third disc of less diameter than the second disc and having ten equidistant concentric circles inscribed thereon, said third disc having the first five lobes of a polar lobe diagram plotted over the concentric circles, and a rotating arm, said discs and arm being rotatable about a common pivot.

2. A device for calculating a vertical polar diagram of a radar station, comprising a first disc having a first direct frequency scale section of a predetermined range of frequencies and a second direct frequency scale section of a different range of frequencies, and a logarithmic scale drawn completely aroud the periphery of the first disc, a second disc of less diameter than said first disc, said second disc having a first scale drawn about its periphery to represent logarithms of squares and a second scale drawn to the squares of the first scale and a third scale similar to the logarithmic scale on said first disc, a third disc of less diameter than said second disc and having a plurality of equidistant concentric circles inscribed thereon, said concentric circles having plotted thereon a plurality of lobes of a polar lobe diagram.

ISIDOR AUERBACH.

REFERENCES CITED

The following references are of record in the file of this patent:

UNITED STATES PATENTS

| Number | Name | Date |
| --- | --- | --- |
| 736,481 | Betts | Aug. 18, 1903 |
| 922,465 | Fenn | May 25, 1909 |
| 1,034,943 | Wohlauer | Aug. 6, 1912 |